(12) United States Patent
Yi et al.

(10) Patent No.: US 9,009,743 B2
(45) Date of Patent: Apr. 14, 2015

(54) DISK DEVICE AND METHOD OF DRIVING TRAY OF DISK DEVICE

(71) Applicant: Toshiba Samsung Storage Technology Korea Corporation, Suwon-si (KR)

(72) Inventors: Ho-Seok Yi, Suwon-si (KR); Eun-Seok Ahn, Seoul (KR); Sang-Phil Hwang, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/939,416

(22) Filed: Jul. 11, 2013

(65) Prior Publication Data

US 2014/0019999 A1 Jan. 16, 2014

(30) Foreign Application Priority Data

Jul. 11, 2012 (KR) .......................... 10-2012-0075690

(51) Int. Cl.
*G11B 17/04* (2006.01)
*G11B 17/056* (2006.01)

(52) U.S. Cl.
CPC .................................. *G11B 17/056* (2013.01)

(58) Field of Classification Search
USPC ........................................................ 720/602
See application file for complete search history.

(56) References Cited

U.S. PATENT DOCUMENTS

| | | | | |
|---|---|---|---|---|
| 5,574,711 A | * | 11/1996 | Nakamichi | 720/602 |
| 6,005,833 A | * | 12/1999 | Yasuma et al. | 720/602 |
| 6,469,975 B1 | * | 10/2002 | Yun | 720/602 |
| 6,643,241 B2 | * | 11/2003 | Takeda | 720/602 |
| 6,981,269 B2 | * | 12/2005 | Minase | 720/602 |
| 7,086,068 B2 | * | 8/2006 | Inoue | 720/602 |
| 7,386,866 B2 | * | 6/2008 | De Hoog et al. | 720/602 |
| 7,614,061 B2 | * | 11/2009 | Ko | 720/602 |
| 8,060,894 B2 | * | 11/2011 | Nakagawa | 720/602 |
| 8,185,919 B2 | * | 5/2012 | Murata | 720/602 |
| 8,387,079 B2 | * | 2/2013 | Andou et al. | 720/602 |

FOREIGN PATENT DOCUMENTS

| | | |
|---|---|---|
| KR | 10-1999-011585 A | 2/1999 |
| KR | 10-2009-0094030 A | 9/2009 |
| WO | WO 2008/072208 A1 | 6/2008 |

* cited by examiner

*Primary Examiner* — Mark Blouin
(74) *Attorney, Agent, or Firm* — NSIP Law

(57) ABSTRACT

A disk device and a method of driving a tray of the disk device. The method includes outputting a tray driving control signal in response to a tray opening instruction, and maximizing an output voltage of the tray driving control signal during a time period in which the tray is expected to be stalled.

19 Claims, 4 Drawing Sheets

DISK DEVICE AND METHOD OF DRIVING TRAY OF DISK DEVICE

CROSS REFERENCE TO RELATED APPLICATIONS

This application claims the benefit under 35 U.S.C. §119(a) of Korean Patent Application No. 10-2012-0075690, filed on Jul. 11, 2012, the entire disclosure of which is incorporated herein by reference for all purposes.

BACKGROUND

1. Field

The following description relates to a data recording apparatus and a data recording method.

2. Description of Related Art

The use of disks for data storage has become more popular with the development of the technology. As the technology has developed, the storage capacity of disks has immensely increased and the purchase price of disks has decreased, accounting for their popularity. A disk for use as a storage medium may include a compact disk (CD), a digital versatile disk (DVD), a blue-ray disk (BD), and the like.

A disk drive or disk device for reading and recording data to a disk typically includes a tray where the disk is loaded, inserted or replaced by a user. The disk drive typically controls the opening or closing of the tray using a tray driving device. The tray driving device typically controls the movement of the tray by outputting a driving signal. Typically, the signal has a constant output which changes in direction depending on whether an opening or closing operation is performed.

A fast driving speed of the tray may cause a loaded disk to deviate from the tray and be scratched. Additionally, fast driving speeds may impose significant impact on the tray when the tray is completely opened or closed, resulting in damage to the disk. If the driving speed of the tray is lowered to prevent the drawbacks described above, the efficiency of the disk drive substantially decreases as a result of the considerable amount of time needed to insert, eject, or replace a disk. Additionally, even if an optimal driving speed is determined, the speed may be affected with changes in surrounding conditions. For example, conditions such as a double-door structure, dust, or aging may affect the opening/closing speed of the tray. Further, a deviation from the preset driving speed may cause the tray to stall while being opened or closed.

SUMMARY

In an aspect, there is provided a method of driving a tray of a disk device, the method including outputting a tray driving control signal in response to a tray opening or a tray closing instruction; and maximizing an output voltage of the tray driving control signal during a time period in which the tray is stalled.

The method may further include maximizing the output voltage of the tray driving control signal while the tray is being stalled and while the time period is determined as an expected open-stall period by measuring a length of time from when the tray is stalled to when the tray is completely opened.

The method may further include configuring the measured length of time to correspond to a time from when the tray is at a location until a time when the tray reaches a completely opened position, wherein the location may be a location where a physical load is being applied while the tray is being opened.

The method may further include configuring the location to be a mechanical inflection point of the disk device.

The opening or closing of the tray may include, outputting a first tray driving control signal, comprising a maximum output voltage, during a first period; outputting second and third tray driving control signals, comprising output voltages that are lower than the first tray driving control signal, during a second period and a third period, respectively; and outputting a fourth tray driving control signal, comprising a maximum output voltage for completely opening the tray, during the time period.

The method may further include configuring four periods, the first period, the second period, the third period, and the time period, to be connected chronologically from a time when the tray starts opening to a time when the tray is completely opened; and configuring a total length of the four periods to fall within a predetermined total time.

The method may further include configuring a ratio between ON-periods and OFF-periods of the output voltage of the tray driving control signal to be maximized during the first period, 10:1 during the second period, 4:1 during the third period, and maximized again during the time period.

The method may further include configuring a tray closing instruction to be blocked during the time period.

The method may further include detecting a sensor-in signal and a sensor-out signal using a sensor; and configuring the output voltage to be maximized when the sensor detects both the sensor-in signal and the sensor-out signal.

In another aspect, there is provided a disk device including a control unit configured to output a tray driving control signal in response to a tray opening or a tray closing instruction, and to maximize an output voltage of the tray driving control signal during a time period in which the tray is stalled; and a tray driving unit configured to receive the tray driving control signal and open the tray according to the received tray driving control signal.

The time period may be an expected open-stall period determined by maximizing the output voltage of the tray driving control signal while the tray is being stalled and measuring a length of time from when the tray is stalled to when the tray is completely opened.

The measured length of time may correspond to a time from when the tray is at a location until a time when the tray reaches a completely opened position; and the location may be a location where a physical load is being applied while the tray is being opened.

The control unit may be further configured to output a first tray driving control signal, comprising a maximum output voltage, during a first period, output second and third tray driving control signals, comprising output voltages that are lower than the first tray driving control signal, during a second period and a third period, respectively, and output a fourth tray driving control signal, comprising a maximum output voltage, during the time period.

Four periods, the first period, the second period, the third period, and the time period, may be connected chronologically from a time when the tray starts opening to a time when the tray is completely opened, and a total length of the four periods may fall within a predetermined total time.

The control unit may be further configured to control the output voltage of the tray driving control signal by maximizing a ratio between ON-periods and OFF-periods during the first period, adjusting the ratio to 10:1 during the second period, adjusting the ratio to 4:1 during the third period, and maximizing the ratio again during the time period.

The control unit may be further configured to block a tray driving control signal for closing the tray during the time period.

The disk device may further include a sensor configured to detect a sensor-in signal and a sensor-out signal, wherein the control unit may be further configured to maximize the output voltage when both the sensor-in signal and the sensor-out signal are detected.

DETAILED DESCRIPTION

Figure 1:
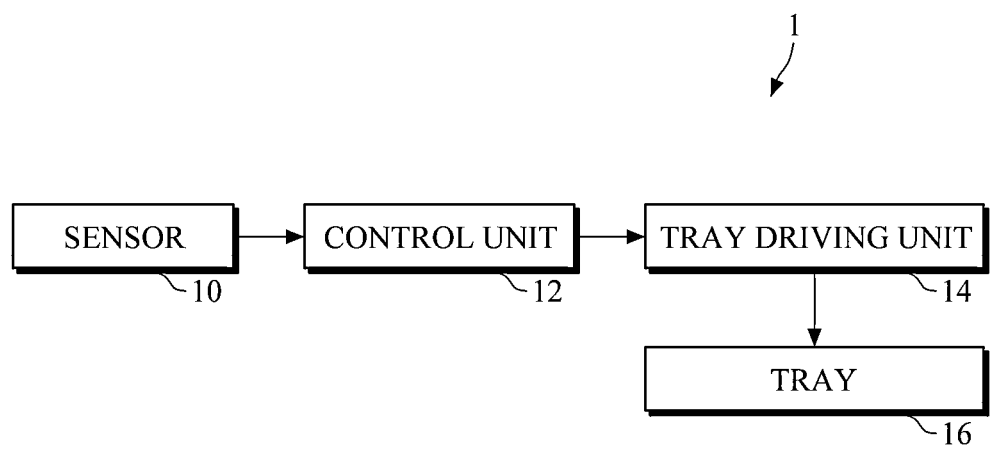
FIG. 1 is a diagram illustrating an example of a disk device.

The following detailed description is provided to assist the reader in gaining a comprehensive understanding of the methods, apparatuses and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a disk device. Referring to FIG. 1, a disk device 1 for driving a tray includes a control unit 12 or controller, a tray driving unit 14 or tray driver, and a tray 16. The disk device 1 may also include a sensor 10.

The tray 16 may be a structural unit to which a disk is loaded. Accordingly, the tray 16 may include a disk receiving space where a disk may be inserted or removed. The disk device 1 may be provided to prevent stalling from occurring while the tray 16 is being opened for insertion, removal or replacement of the disk. More specifically, the disk device 1 may allow the tray 16 to be opened safely and normally regardless of a change in surrounding conditions.

Surrounding conditions which may affect the normal operation of a disk tray may include a double-door, dust, and aging. This may lead to the tray being stalled while being opened, which is referred to as an open stall. In an example, the disk device 1 may prevent such open stalls. This may be done by setting a predetermined expected open-stall period, in which the tray is expected to be stalled while being opened, and maximizing an output voltage of a driving control signal during that predetermined period. Accordingly, this mechanism may allow the tray to open within a target reference time. The predetermined expected open-stall period may be a time period during which the open stall is predicted to most likely occur, and may be previously obtained in the process of designing the disk device. A target reference time may refer to the time period from when the tray starts being opened until when the tray is completely opened, in response to a tray opening instruction. In one example, this period of time may be 2.5 seconds. In another example, the described tray opening technology may also be applied to the tray closing process. Referring to FIG. 1, the control unit 12 may output a tray driving control signal to control the tray driving unit 14 in response to an opening instruction from a user. The tray driving unit 14 may open the tray 16 in response to the tray driving control signal from the control unit 12. The tray driving unit 14 may be a tray driving motor.

The control unit 12 may divide the tray opening process into four periods. The four periods may include a first period, a second period, a third period, and a predetermined expected open-stall period. The four periods may be consecutively connected to one another and may correspond to a length of time from when the tray starts opening until when the tray is completely open. The total length of time of the four periods may fall within a predetermined total period of time. The control unit 12 may recognize each of the period sections using a timer.

While the tray is being opened, the control unit 12 may vary the output voltage of the tray driving control signal such that a different output voltage is applied during each of the periods. For example, the control unit 12 may output a tray driving control signal whose intensity is adjusted by controlling the voltage based on each of the four periods. In this example, the control unit 12 may output a tray driving control signal whose output voltage is maximized during the first period, lowered during the second and third periods, and maximized again during the expected open-stall period.

The control unit 12 may control the driving control signal using a pulse width modulation (PWM) scheme. PWM may be used to supply current to a load by turning a switch, such as a transistor, on and off. Accordingly, PWM may control an output voltage by changing a ratio between ON-periods and OFF-periods. For example, the control unit 12 may maximize the number of ON-periods during the first period in order to maximize the output voltage. Also, the control unit 12 may adjust a ratio between the ON-periods and the OFF-periods to 10:1 during the second period section and to 4:1 during the third period. The output voltage may once again be maximized by maximizing the number of ON-periods during the expected open-stall period.

As the output voltage increases due to a greater number of ON-periods, the driving speed and driving force of the tray may generally increase. Similarly, if the number of ON-periods is decreased, the output voltage decreases resulting in a decrease of the driving speed and driving force of the tray. In other examples, the ratio between the ON-periods and the OFF-periods may vary according to a type or specifications of a disk. In another example, the output voltage may be the same throughout all four periods or may have different patterns based on desired driving speeds for the tray.

The expected open-stall period, in which the control unit 12 may maximize the output voltage, may be determined during the process of designing the device. For example, during the device designing process, the output voltage may be set to be maximized during the period of time when the tray is stalled while being opened. The period of time from when the tray is stalled to when the tray is completely opened may then be measured. This measured period of time may be set as the expected open-stall period.

In another example, the position of a tray when a physical resisting load is predicted to be experienced may be calculated. When the tray is in the calculated position, the output voltage of the tray driving control signal may be maximized to correspond to the period of time when the tray is being stalled. The period of time from when the tray is stalled to when the tray is completely open may be set to the expected open-stall period. The control unit 12 may prevent the tray from closing during the expected open-stall period by adjusting the output of the tray driving control signal, thereby allowing the tray 16 to reach a completely opened position.

In one example, the sensor 10 may detect a sensor-in signal and a sensor-out signal. When the sensor 10 detects both the sensor-in signal and the sensor-out signal, the control unit 12 may determine that the tray is erroneously operated, and maximize the output voltage of the tray driving control signal.

Figure 2:
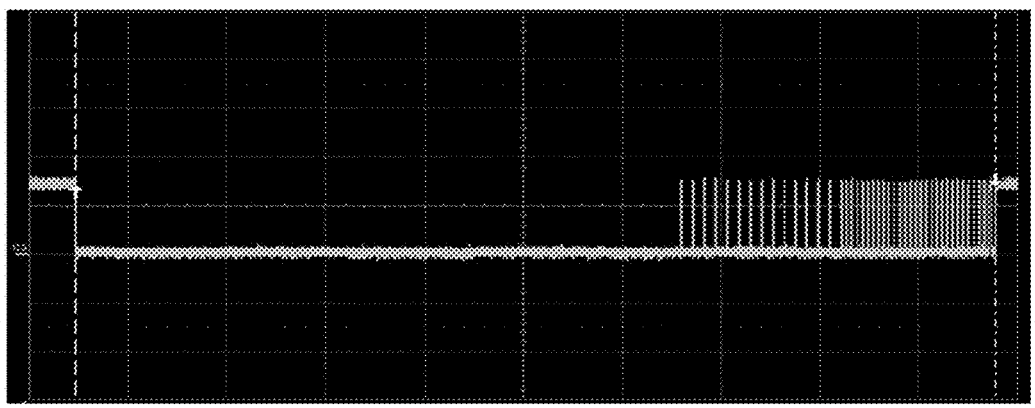
FIG. 2 is a diagram illustrating an example of variations in an output voltage when pulse width modulation (PWM) is performed without a tray being stalled.

FIG. 2 is a diagram illustrating an example of variations in an output voltage when PWM is performed without a tray being stalled. Referring to FIGS. 1 and 2, when it is assumed or determined that the tray is not stalled, the control unit 12 may control the output voltage by changing a ratio between ON-periods and OFF-periods during the first to third periods of the tray opening process. In this example, the periods having a larger ratio of ON-periods to Off-periods have a greater output voltage and tray driving speed. For example, the control unit 12 may maximize the ON-periods during the first period, adjust the ratio to 10:1 during the second period, and adjust the ratio to 4:1 during the third period.

In other examples, the ratio between the ON-periods and the OFF-periods may vary according to a type or specifications of a disk. Also, the output voltage may be controlled without the use of ON/OFF periods. For example, the output voltage may be controlled in the form of successive waves of different intensities that are varied while the output voltage is being maintained in the ON state. Further, the same tray driving control mechanism using a similar control signal as produced in the tray opening process, except for the direction, may be generated in a process of closing the tray.

Figure 3:
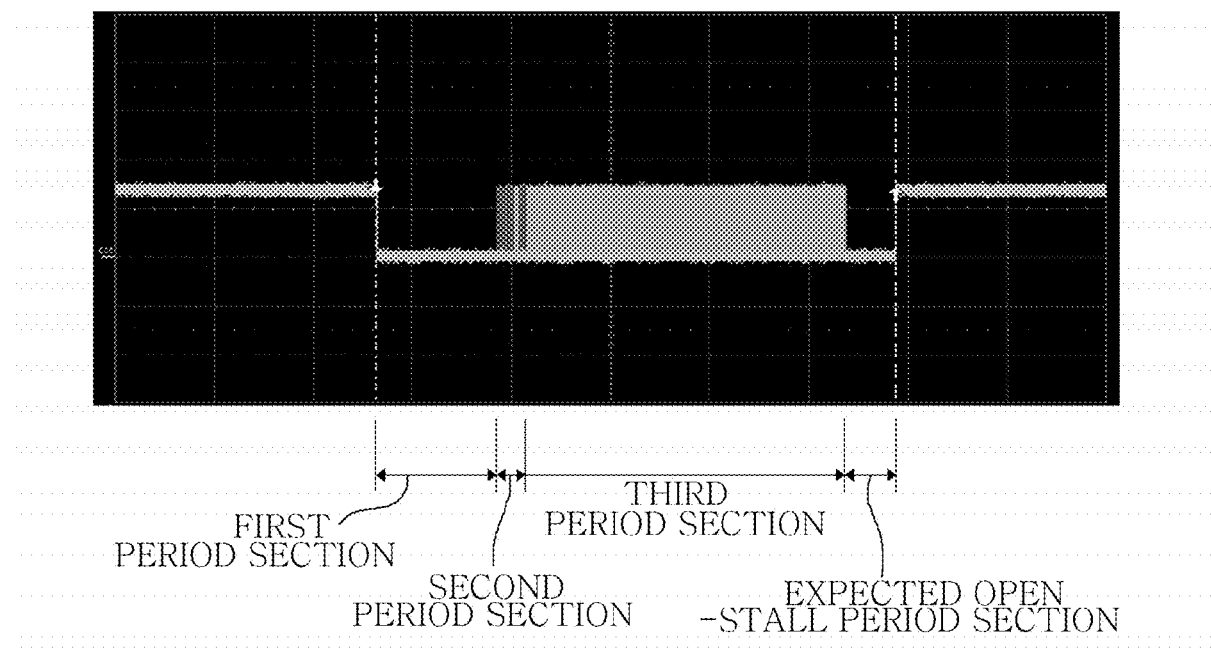
FIG. 3 is a diagram illustrating an example of variations in an output voltage when PWM is performed while a tray is being stalled.

FIG. 3 is a diagram illustrating an example of variations in an output voltage when PWM is performed while a tray is being stalled. Referring to FIGS. 1 and 3, when it is determined or assumed that the tray is stalled while being opened, the control unit 12 may control the output voltage by changing ratios between ON-periods and OFF-periods during four periods of time. For example, the control unit 12 may maximize ON-periods during the first period, adjust the ON/OFF period ratio to 10:1 during the second period section, and adjust the ON/OFF period ratio to 4:1 during the third period. Thereafter, the control unit 12 may output a control signal whose output voltage is maximized again during a predetermined expected open-stall period.

In this example, the time elapsed during each of the four periods may be measured by a timer and recorded. Also, the total time elapsed during all four periods may be adjusted to fall within a predetermined reference length of time. The reference length of time may correspond to a period from the start of opening the tray to when the tray has completely opened, in response to an opening instruction. For example, this period may be 2.5 seconds.

In other examples, the position of the expected open-stall period and the ratio of the ON/OFF periods may vary. For example, the expected open-stall period may be subsequent to the third period as shown in FIG. 3. In other examples, the position of the expected open-stall period may be set in other positions according to the physical properties and specifications of the disk device. Also, in other examples, the output voltage may be controlled in the form of successive waves of different intensities that are varied while the output voltage is being maintained in an ON state. Also, the same tray driving control signal as produced in the tray opening process, except for the direction, may be generated during a tray closing process. Further, the total number of periods may be adjusted according to the physical properties and specifications of the disk device.

Figure 4:
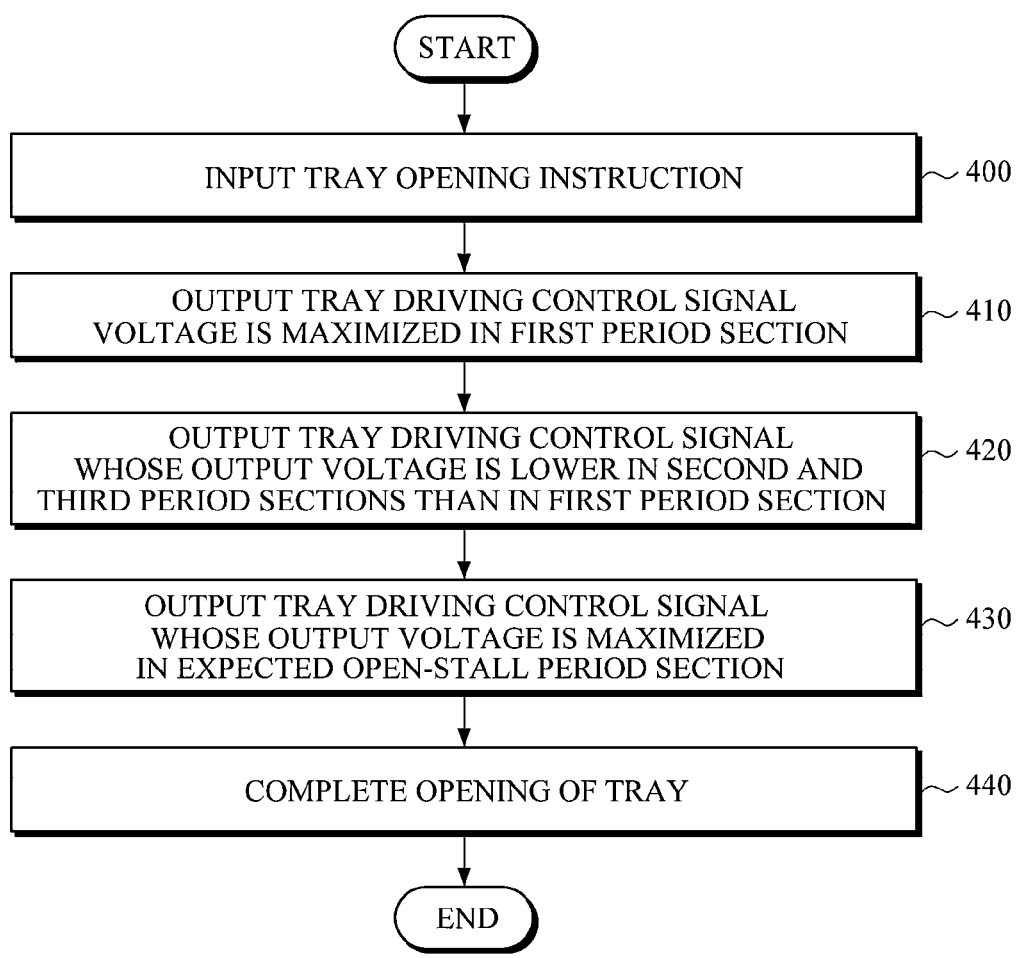
FIG. 4 is a flowchart illustrating an example of a method of driving a tray of a disk device.

FIG. 4 is a flowchart illustrating an example of a method of driving a tray of a disk device. Referring to FIGS. 1, 3, and 4, a disk device 1 may output a tray driving control signal in response to a tray opening instruction to open the tray. The disk device 1 may open the tray by maximizing an output voltage of the control signal during a predetermined expected open-stall period.

For example, the disk device 1 may divide the tray opening process into four periods, including a first period, a second period, a third period, and an expected open-stall period. The four periods may be connected sequentially from the start of opening the tray to the completion of opening the tray. The total time elapsed during the periods may be set to fall within a predetermined reference length of time.

Referring to FIG. 4, in response to the tray opening instruction being input in operation 400, a tray driving control signal whose output voltage is maximized in the first period may be output in operation 410. In operation 420, a tray driving control signal whose output voltage is lower during the second and third periods than the first period may be output. A ratio between ON-periods and OFF-periods may be 10:1 during the second period and 4:1 during the third period. Thereafter, a tray driving control signal whose output voltage in the expected open-stall period is maximized may be output so as to completely open the tray in 430. The tray opening process may be completed in operation 440. During operation 430, a tray closing instruction may be blocked during the expected open-stall period in order to allow the tray to completely open. Although a particular order has been described for the flowchart of FIG. 4, that particular order does not need to be followed.

The expected open-stall period may be a predetermined period that is previously defined. For example, the output voltage of the tray driving control signal may be maximized at the time of open stall, and a length of time from the open stall until the tray is completely opened may be measured. This measured period of time may be set as the expected open-stall period. One way to predict the period in which an open stall occurs is by measuring an opening speed of the tray and a location at which a physical resisting load is likely to be experienced. If the tray is stalled at the calculated location, the output voltage of the tray driving control signal is maximized and the length of time from when the tray is stalled to when the tray is completely opened is measured. This measured period may correspond to the predetermined expected open-stall period. The predicted location at which the physical resistance load is likely to be experienced may be a mechanical inflection point of the disk device.

In another example, the method of predicting when an open-stall period occurs may further include detection of a sensor-in signal and a sensor-out signal. In this example, the output voltage of the tray driving control signal may be maximized in operation 430 only when both the sensor-in and sensor-out signals are detected.

In an example, a tray may safely and normally operate in a process of opening and closing the tray despite surrounding conditions. That is, the open stall due to a change in an opening/closing speed of the tray, which is caused by surrounding conditions, may be prevented from occurring. Such surrounding conditions may include a double-door, dust, and aging of the tray. As a result, it may be possible to increase a lifespan of a disk drive and prevent its defective operation. In addition, it may be possible to improve the efficiency of operations, such as insertion, ejection and replacement of a disk. The disk may also be prevented from deviating from the disk receiving space of the disk drive and thereby being scratched.

The sensor, control unit, tray driving unit, and tray described above may be implemented using one or more hardware components, or a combination of one or more hardware components and one or more software components. A hardware component may be, for example, a physical device that physically performs one or more operations, but is not limited thereto. Examples of hardware components include controllers, microphones, amplifiers, low-pass filters, high-pass filters, band-pass filters, analog-to-digital converters, digital-to-analog converters, and processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

Software or instructions for controlling a processing device, such as those described in FIG. 4, to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of driving a tray of a disk device, the method comprising:
    outputting a tray driving control signal in response to a tray opening or a tray closing instruction; and
    maximizing an output voltage of the tray driving control signal during a time period in which the tray is stalled in response to an output voltage of the tray driving control signal being less than the maximum output voltage so that stalling or closure of the tray is prevented.

2. The method of claim 1, further comprising maximizing the output voltage of the tray driving control signal while the tray is being stalled and while the time period is an expected open-stall period, the expected open-stall period being determined by measuring a length of time from the tray being stalled to the tray being completely opened.

3. The method of claim 2, further comprising configuring the measured length of time to be a time from when the tray is at a location until a time when the tray reaches a completely opened position, wherein the location is a location of a physical load being applied while the tray is being opened.

4. The method of claim 3, further comprising configuring the location to be a mechanical inflection point of the disk device.

5. The method of claim 1, wherein the opening or closing of the tray comprises:
    outputting a first tray driving control signal, comprising a maximum output voltage, during a first period;
    outputting second and third tray driving control signals, comprising output voltages that are lower than the first tray driving control signal, during a second period and a third period, respectively; and
    outputting a fourth tray driving control signal, comprising a maximum output voltage for completely opening the tray, during the time period.

6. The method of claim 5, further comprising:
configuring the first period, the second period, the third period, and the time period, to be connected chronologically from a time the tray starts opening to a time the tray is completely opened; and
configuring a sum of lengths of the first period, the second period, the third period, and the time period to be within a predetermined total time.

7. The method of claim 5, further comprising: configuring a ratio between ON-periods and OFF-periods of the output voltage of the tray driving control signal to be maximized during the first period, 10:1 during the second period, 4:1 during the third period, and maximized during the time period.

8. The method of claim 5, further comprising configuring a tray closing instruction to be blocked during the time period.

9. The method of claim 5, further comprising:
detecting a sensor-in signal and a sensor-out signal using a sensor; and
configuring the output voltage to be maximized in response to the sensor detecting both the sensor-in signal and the sensor-out signal.

10. A disk device comprising:
a control unit configured to output a tray driving control signal in response to a tray opening or a tray closing instruction, and to maximize an output voltage of the tray driving control signal during a time period in which the tray is stalled; and
a tray driving unit configured to receive the tray driving control signal and open the tray in response to receiving the tray driving control signal, wherein
the control unit is configured to maximize the output voltage of the tray driving control signal in response to an output voltage of the tray driving control signal being less than the maximum output voltage so that stalling or closure of the tray is prevented.

11. The disk device of claim 10, wherein the time period is an expected open-stall period determined by maximizing the output voltage of the tray driving control signal while the tray is being stalled and measuring a length of time from the tray being stalled to the tray being completely opened.

12. The disk device of claim 11, wherein the measured length of time is a time from when the tray is at a location until a time when the tray reaches a completely opened position; and the location is a location of a physical load being applied while the tray is being opened.

13. The disk device of claim 11, wherein the control unit is further configured:
output a first tray driving control signal, comprising a maximum output voltage, during a first period;
output second and third tray driving control signals, comprising output voltages lower than the first tray driving control signal, during a second period and a third period, respectively; and
output a fourth tray driving control signal, comprising a maximum output voltage, during the time period.

14. The disk device of claim 13, wherein the first period, the second period, the third period, and the time period are connected chronologically from a time the tray starts opening to a time the tray is completely opened, and the sum of the first period, the second period, the third period, and the time period is within a predetermined total time.

15. The disk device of claim 13, wherein the control unit is further configured to control the output voltage of the tray driving control signal by maximizing a ratio between ON-periods and OFF-periods during the first period, adjusting the ratio to 10:1 during the second period, adjusting the ratio to 4:1 during the third period, and maximizing the ratio during the time period.

16. The disk device of claim 13, wherein the control unit is further configured to block a tray driving control signal that closes the tray during the time period.

17. The disk device of claim 13, further comprising:
a sensor configured to detect a sensor-in signal and a sensor-out signal,
wherein the control unit is further configured to maximize the output voltage in response to both the sensor-in signal and the sensor-out signal being detected.

18. The disk device of claim 10, wherein the control unit is configured to maximize the output voltage of the tray driving control signal in response to determining that the tray is erroneously operated.

19. The disk device of claim 10, wherein the control unit is further configured to set an output voltage of the tray driving control signal to be less than the maximum output voltage in between two time periods in which the output voltage of the tray driving control signal is set to be the maximum output voltage.

* * * * *